April 26, 1949.    M. J. NAPIER    2,468,636
OIL STRATIFYING METHOD AND APPARATUS
Filed Feb. 28, 1945    2 Sheets-Sheet 2
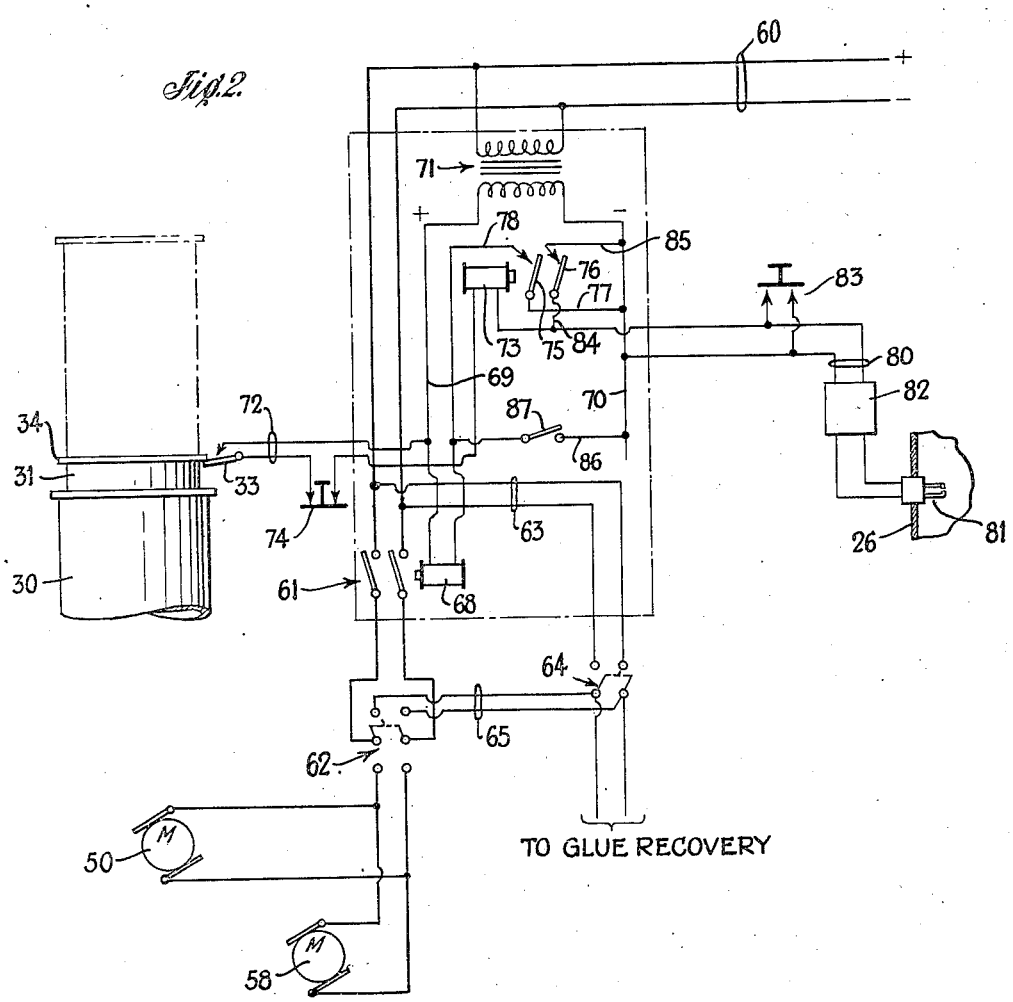
INVENTOR
MELVIN J. NAPIER
By Ely & Frye
ATTORNEYS Patented Apr. 26, 1949

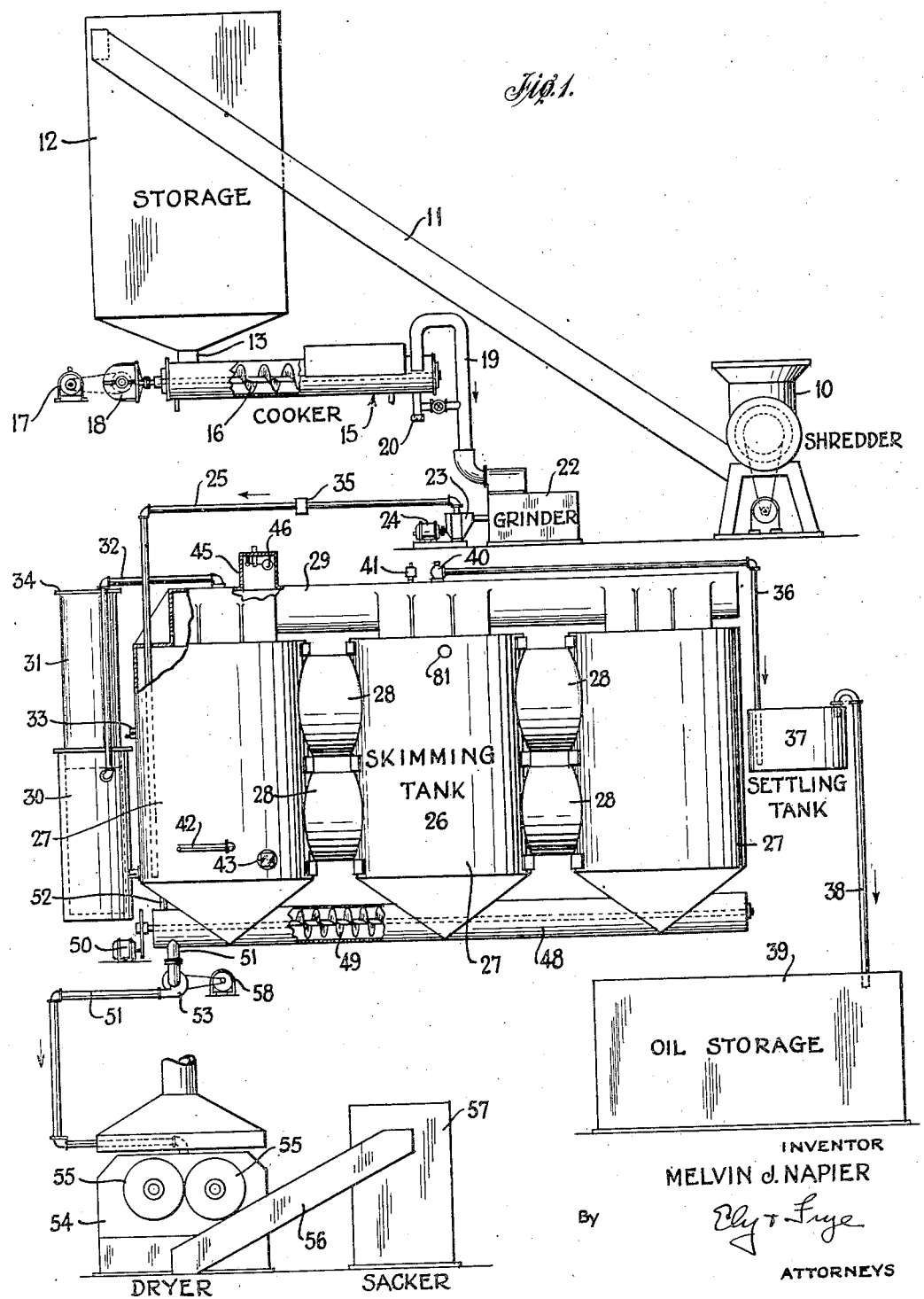

2,468,636

UNITED STATES PATENT OFFICE 2,468,636

OIL STRATIFYING METHOD AND APPARATUS

Melvin J. Napier, Akron, Ohio, assignor to Miami Boiler & Machine Company, Inc., Akron, Ohio, a corporation of Ohio Application February 28, 1945, Serial No. 580,233

9 Claims. (Cl. 260—412.6)

This invention relates to the art of processing organic materials, and more especially it relates to procedure and apparatus for recovering valuable residual products from the refuse of food processing plants.

The invention is applicable to the processing of both animal and vegetable products, and will be described herein as it applies to the processing of marine animal products, specifically fish, to recover oil therefrom, and sometimes glue if desired, and to produce a dried food product suitable for live stock and poultry from the solids of the treated material.

The full advantages of the invention are realized when it is installed on sea-going fishing ships that may operate two or three hundred miles from their home ports. On such ships at present it is customary to toss overboard the poisonous fish and fish too small to fillet, and to pack the remainder of the catch in ice in the hold of the ship and bring it to port to be processed. By means of the present invention, it will be possible to dress the fish during the return trip to port. Thus large fish may be cut into steaks and cold-packed. Smaller fish may be filleted and the fillets packed in ice. Fish too small to be filleted, and waste products such as heads, tails, fins, viscera and the like immediately may be utilized to produce fish oil, fish meal, and glue if desired, thus increasing the profit to the fisherman for his labors. Furthermore, such delay as would occur if the waste-products were returned to port for processing is obviated, and putrifaction is avoided, thus avoiding the creation of unpleasant odors and unsanitary working conditions. Furthermore, since fish are 70% water, the practice of the invention, whereby the water is removed from the fish, will enable a ship to return to port with a pay load nearly three times greater in volume than was heretofore possible.

The chief objects of the invention are to provide in an improved and efficient manner for the recovery of valuable residual products from the waste-products of food processing plants; to provide a completely enclosed system for processing organic materials; to provide apparatus for the purpose mentioned that is substantially automatic in operation; to provide a system of the character mentioned that is especially adapted for installation aboard ships; and to enable ships to return to port with a larger pay load. More specifically the invention aims to utilize residual products that previously were discarded; and to do so while maintaining healthful and not unpleasant working conditions. Other objects will be manifest as the description proceeds.

Of the accompanying drawings:

Fig. 1 is a somewhat diagrammatic view of apparatus embodying and adapted for the practice of the invention; and Fig. 2 is a wiring diagram of an electric control system that effects automatically synchronized operation of some of the elements of the apparatus.

The method of the invention briefly may be summarized as follows: The waste fish products first are cut into relatively small pieces, and then conveyed to a storage receptacle. From the latter the cuttings pass by gravity into a cooker through which they are slowly forced, under pressure, and exposed for a suitable length of time to cooking temperature. While cooking, the cuttings are agitated, stirred, and mangled to effect maximum disintegration, the product discharged from the cooker being substantially in the form of mash or pulp. Next the pulp is treated to a grinding or pulverizing operation which comminutes the fish bones, which have been softened by cooking. The mash, still hot, is forced into a separator or skimming tank where it separates into its component ingredients, the solids settling to the bottom, the oil rising to the top, the water and glue constituting the intermediate stratum. The content of the skimming tank is maintained under pressure to prevent undue agitation resulting from motion of the boat. When the skimming tank is full, the upper stratum of oil is drawn off and passed first to a settling tank to remove any solid particles in suspension, and then passed into storage. As soon as the amount of oil in the skimming tank reaches a determinate minimum, pulp is progressively removed from the bottom thereof and conveyed to a dryer where moisture is removed therefrom, the dry meal then being sacked and stored. If desired the water with glue in solution may be withdrawn from the skimming tank at any time and passed to a glue recovery system, but this is not an essential feature of the invention.

Referring now to Fig. 1 of the drawings, there is shown at 10 a shredding apparatus of any known or preferred design, which apparatus receives fish products manually deposited therein, and cuts said products into pieces of smaller size. From the shredder 10 an enclosed conveyor 11 extends to the top of a storage receptacle 12 wherein the shredded product is received and stored pending subsequent treatment. The conveyor 11 may consist of an endless belt, or it may be a screw conveyor if desired. Preferably the receptacle 12 is closed except for the inlet opening through which the conveyor 11 discharges its load, and one or more discharge chutes 13 at the bottom thereof through which the fish cuttings pass by gravity.

Positioned below the storage receptacle 12 is a digester or cooker 15. Although but one of the latter is shown, it is contemplated that several may be provided, and as many concurrently used as is necessary to handle the cuttings dumped into the receptacle 12. The cooker 15 is an elongate structure having a feed screw 16 therein adapted to impel the cuttings from one end thereof to the other, the chute 13 from the receptacle discharging into the cooker at one end thereof. The screw 16 is driven by a motor 17 through the agency of gearing enclosed in a gear housing 18, and not only impels the work, but places it under pressure and stirs and mangles it. The cooker is steam jacketed so as to heat the product passing therethrough, the speed of feed of the screw being such that the product is cooked for approximately twenty minutes while in the cooker. At the delivery end of the cooker is a discharge chute 19 that extends from the top of the cooker so as to require pressure on the product to force the same from the cooker. The delivery end of the cooker also is provided with a sump 20 into which foreign objects will collect, and from which they subsequently may be removed.

Positioned to receive the hot cooked product from the chute 19 is a grinder 22. The latter, which may be of any suitable or preferred construction, finely comminutes the cooked product, including the fish bones which have been rendered soft by the cooking operation. After grinding, the product is a viscous flowable pulp or mash. Said mash is removed from the grinder by means of a pump 23 driven by a motor 24, and is discharged from the pump 23 through a pipe or conduit 25 that extends substantially to the bottom of a skimming tank that is designated as a whole by the numeral 26. There is a check valve 35 in pipe 25, which valve prevents recession of mash in the pipe when pump 23 is not in operation. Said skimming tank is composed of a plurality of cylindrical tanks 27, 27 interconnected by ducts 28, 28 of large capacity, the arrangement being such as to obtain the strength of circular tanks without the waste of space which would result if a single circular tank were used. Positioned atop the tanks 27 is an oil chamber 29 that is in communication with all of said tanks 27. Mounted adjacent the skimming tank is an accumulator 30 that comprises a hollow cylinder having a piston-like element 31 mounted therein and movable in a vertical direction according to the pressure of fluid in said hollow cylinder. Fluid is forced into and out of the latter through a pipe 32 that is in communication with the oil chamber 29 at the top thereof. The element 31 is shown in fully elevated position in Fig. 1 and in broken lines in Fig. 2, and is shown in its lowermost position in full lines in Fig. 2. Mounted upon the side of the skimming tank 26, or on any other suitable support, is an electrical switch 33 that has an operating lever that projects into the path of a flange 34 located at the top of piston-like element 31, the arrangement being such that said flange engages and operates said switch when the element 31 is in its lowermost position, as is clearly shown in Fig. 2.

The switch 33 is opened by the action of the flange 34 thereagainst, the switch closing when the element 31 rises appreciably above its lowermost position. The function of the switch 33 in the operation of the apparatus presently will be explained. At the highest point of the oil chamber 29, above the opening of pipe 32 thereinto, is a dome 45 in which is an air vent controlled by a float valve 46. The arrangement enables air to escape during filling of the skimming tank, the valve closing after the bottom of the accumulator is full so that pressure may be built up in the tank.

Extending from the top of the oil chamber 29 is a pipe or duct 36 through which oil is removed therefrom. Said pipe 36 preferably discharges into a settling tank 37, from which the oil is removed by way of a pipe or duct 38 and delivered to a storage tank 39. In the settling tank 37 any solids in suspension are removed from the oil so that only the clear product is placed in storage. The pipe 36 communicates with the oil chamber 29 through the agency of an adjustable control valve 40 that opens only when the pressure within the oil chamber is greater than the oil pressure required to elevate the piston-like element 31 to its uppermost position. Also mounted in the top of the oil chamber 29 is an inwardly opening relief valve 41 adapted to admit air to the interior of the skimming tank and thus to prevent the establishing of sub-atmospheric pressure therein, upon occasion, such as when the contents of the tank are being withdrawn, as presently will be explained. Tapping the skimming tank 26, somewhat below the middle altitude thereof, is a pipe 42 through which water, with glue in solution, may be withdrawn and conducted to a glue recovery system. The latter is not a part of the present invention, and for that reason is not shown or described herein. A small window or peep hole 43 is located in the wall of the skimming tank 26, near the pipe 42, so that the height of the precipitated solids in the bottom of the tank may be determined by visual observation.

The bottoms of the individual units 27 of the settling tank 26 preferably are conical as shown, and intersecting said conical bottoms is an unloading duct 48 that is in communication with the interior of the several duct 48 that is in communication with the interior of the several units 27. Operatively mounted within the duct 48 is a feed screw 49 that is rotated at suitable angular speed by an electric motor 50 located adjacent one end of the duct. The function of the feed screw 49 is to remove sludge or solids from the skimming tank 26 and impel the same through the unloading duct 48 to one end of the latter, and into a discharge pipe 51 that is in communication with the delivery end of said duct. A small pipe 52 connects the discharge end of the duct 48 with the interior of the skimming tank to relieve excessive pressure that may be built up in the duct by the screw 49.

The pipe 51 extends to a pump 53 driven by a motor 58, and thence to a drying apparatus 54, which may be of any known or preferred type, but is conventionally shown as comprising a pair of opposed, heated rolls 55, 55 that receive the sludge in the bite of the rolls and dry the same, the dried product being removed therefrom in the form of meal. The dry meal is removed from the dryer by a conveyor 56 of any suitable kind, and delivered to a sacking device, indicated at 57, where measured quantities of the meal are placed in sacks for storage and subsequent shipment and use. The particular sacking device employed is not a part of the present invention so that a more detailed showing thereof need not be presented.

The general operation of the system will be apparent from the foregoing description thereof. During such operation the oil is removed automatically from the oil chamber 29, and subsequently the sludge is automatically removed from the bottom of the skimming tank. Such automatic operation of the latter is achieved by means of electrical apparatus, the wiring diagram of which is shown in Fig. 2, to which attention now is directed. Said circuit comprises a main power circuit 60 for energizing the motor 50 and motor 58, said power circuit including a normally open, relay-operated switch 61, and a manually operated two-pole double throw switch 62. From the power circuit 60 extends a branch circuit 63 that controls the operation of the glue recovery system, said circuit being so connected to circuit 60 as to be unaffected by switches 61, 62. There is a manually operated two-pole single throw switch 64 in circuit 63 by means of which the glue recovery system may be put into operation at any time. There is also a circuit 65 connecting switch 62 to switch 64 whereby the glue recovery system may, if desired, be put into operation automatically, while the motors 50 and 58 and unloading mechanism operated thereby are idle.

A control circuit of lower voltage than the power circuit 60 is provided for effecting automatic operation of a relay 68, which relay operates the aforementioned relay switch 61. Said control circuit comprises conductors 69, 70 that are operatively connected to the power circuit 60 through the agency of the usual transformer 71. The switch 33, that is operated by the accumulator 30, is in a circuit 72, one conductor of which is connected to conductor 69 and the other conductor of which extends to one side of a relay 73, the last mentioned conductor having a normally closed, manually operated push button switch 74 mounted therein. The relay 73 operates two normally open switches 75 and 76. Switch 75 is connected by conductor 77 to conductor 70, and when actuated by relay 73, said switch 75 makes contact with conductor 78 that connects to one side of relay 68, the other side of the latter being connected to conductor 69. Thus actuation of relay 73 will result in actuation of relay 68 to close switch 61 in the power circuit to motors 50 and 58.

Operating in conjunction with circuit 72 to operate relay 73 is a circuit 80 that extends to a switch 81, one conductor of circuit 80 being connected to conductor 70 and the other conductor being connected to the other side of relay 73. The switch 81 is of the type known to trade as a "Thyratron electronic controlled" switch. It is mounted in the wall of the skimming tank 25, somewhat near the top thereof, and has two spaced-apart terminals that project into the interior of the tank so as to be submerged in the fluid contents thereof. The switch terminals are so spaced that when submerged in oil, no electric current will pass therebetween, but when submerged in water, a very small current will flow across their gap. This small current is amplified by suitable instrumentalities located in the receptacle 82. It will be seen that switch 81 is in series with switch 33 in the circuit of relay 73, so that when switch 81 is submerged in water and switch 33 is closed by reason of the elevation of member 31 of accumulator 30, the relay 73 automatically is energized to close switches 75, 76. There is a manually operated, normally open push button switch 83 across circuit 80 by which the latter may be closed at any time, whereby relays 68 and 73 may be closed to effect operation of motors 50 and 58 at any time that member 31 is in elevated position. Relay switch 76 has a connection 84 with the conductor of circuit 80 that extends to relay 73, and when the latter is actuated said switch 76 makes contact with conductor 85 extending to conductor 70. The arrangement constitutes a holding circuit for relay 73 after switch 83 has been closed and then released. Push button 74 is employed to open the control circuit and stop motor 50 at any time desired. There is a conductor 86 connecting conductors 70 and 78 and having a normally open manually operated switch 87 therein. By manual closing of the latter the relay 68 may be energized at any time to close the power circuit to motors 50 and 58.

In the operation of the skimming tank, the fish mash is forced into the bottom thereof through pipe 26, the solid particles collecting at the bottom thereof, the oil rising to the top, and the water-glue mixture collecting in the intermediate region. When the skimming tank, including the oil chamber 29, becomes substantially full, the oil at the top flows through pipe 32 into accumulator 30 and begins to raise member 31 thereof. Thereafter continued flow of mash into the skimming tank closes float valve 46 and thereafter increases the internal pressure in the tank until it forces open valve 40, thus enabling the oil to be forced through pipe 36 to the settling tank 37 and therefrom to the storage tank 39. As oil is forced from the skimming tank, the level of the water therein rises and eventually covers the switch 81. Since switch 33, which is in series with switch 81, already has been closed by elevation of the accumulator member 31, closing of switch 81 effects operation of the control circuit to close relays 68 and 73 and thereby to close the power circuit 60 to the motors 50 and 58, it being understood that switch 62 normally is positioned to connect said motors to the power circuit.

Operation of motor 50 drives feed screw 49 and thus effects withdrawal of sludge from the bottom of the skimming tank, said sludge passing into pipe 51 and being forced by pump 53 to the dryer 54, the dried sludge or meal being conveyed to the sacker 57 and placed in suitable containers. The unloading screw 49 removes material from the bottom of the skimming tank faster than the pump 23 can force mash thereinto, with the result that the pressure in the accumulator 30 is lowered, oil valve 40 closes, and element 31 of the accumulator descends. In fully lowered position element 31 opens switch 33, thus de-energizing relays 68 and 73 and opening the power circuit to motors 50 and 58, bringing the same to a stop. This completes a cycle of operation which is repeated as soon as pump 23 forces sufficient mash into the skimming tank to build up pressure sufficient to raise member 31 of the accumulator. By means of the switch 62 the glue recovery system may be caused to operate automatically while the unloading screw 49 is idle, or said glue recovery system may be operated at any time desired by means of the switch 64. Whenever it is desired completely to empty the skimming tank, as for cleaning the same, the switch 87 may be closed to energize relay 68 and thus to close the power circuit to motors 50 and 58. As soon as sufficient material is withdrawn to reduce the pressure in the tank to atmospheric, valve 41 opens to admit air to the tank so that sub-atmospheric pressure is not created in the tank. Valve 46 opens after the fluid level of the material in the tank has been lowered.

From the foregoing it will be apparent that the apparatus is largely automatic in operation, thereby saving labor. The mash enters the skimming tank while still hot from the cooking operation whereby maximum separation of oil, water and solids is achieved. The system is almost completely enclosed so that the presence of noxious odors largely is avoided. Another factor contributing to the improvement of working conditions is the processing of the fish products shortly after the catch, whereby the operators are not required to handle partly decomposed material. The invention is especially advantageous for installation aboard fishing boats since the content of the skimming tank is under pressure substantially at all times, and thus is not agitated by motion of the boat. Moreover, a substantial saving of time is effected by processing the waste material before reaching port, and boats equipped with the invention bring home greater pay loads.

Modification may be resorted to without departing from the spirit of the invention or the scope thereof as defined by the appended claims. While the invention has been illustrated with respect to its employment as a sea-borne plant, obviously the same principles will apply in any installation subject, by the nature of its environment, to motions about an equilibrium position, which motions would tend to defeat an orderly settling process.

What is claimed is:

1. In apparatus for treating oil bearing material, of the type requiring an aqueous component in the digesting process the combination of a closed tank, an accumulator adjacent thereto and having a pipe connection therewith, said accumulator including a pressure responsive member, means for continuously forcing a mash of cooked oil bearing material, including the aqueous component into said tank where said mash separates into respective strata according to the specific gravity of its respective elements, means at an upper level of the tank responsive to pressure of the material at the top of the tank, above atmospheric pressure for initiating outflow of oil from the top thereof, means for withdrawing precipitated solids from the bottom of the tank at a faster rate than the infeed of the mash whereby pressure in the accumulator is reduced, means responsive to the removal of oil from the tank for initiating operation of the solids-removing mechanism, and means controlled by the position of the pressure-responsive member of the accumulator for terminating operation of said solids-removing mechanism.

2. In apparatus for treating oil-bearing material, the combination of a closed tank, means for continuously forcing a mash of cooked, oil-bearing material into said tank, means responsive to a predetermined value of the pressure of said material within the filled tank, which pressure is consequent upon said forcing means, for initiating outflow of oil from the top of the tank, means for withdrawing solids from the bottom of the tank at a greater rate than that at which the material is forced into the tank, and means for terminating withdrawal of the solids as the said pressure of the material in the tank is abated in response to said greater rate of withdrawal.

3. In an installation of the type subject during use to motion about a position of equilibrium, the method of treating organic oil bearing material of the type requiring an aqueous component in the digesting process, which comprises continuously cooking and comminuting the material to form a mash, continuously forcing the mash including the aqueous component into a closed container until pressure above atmospheric is built up therein at the top of the container, whereupon constituent elements of the mash, including an aqueous phase, separate from each other in accordance with their specific gravities, withdrawing oil from the top of the container, and then withdrawing precipitated solid matter from the bottom of the container while maintaining the established pressure in the latter after the oil content thereof has been reduced to a predetermined amount.

4. In apparatus for treating oil bearing material of the type having an aqueous component, the combination of a closed tank, means for continuously forcing a mash of cooked, oil bearing material, including the aqueous component, into said tank where said mash separates into respective strata according to the specific gravities of the components, and means at an upper level of the tank responsive to pressure in said material, above atmospheric at the top of the tank for initiating outflow of oil therefrom under the urging of said forcing means when the pressure in the tank exceeds a predetermined limit.

5. In an installation of the type subject during use to motion about a position of equilibrium, the method of treating organic, oil-bearing material of the type requiring an aqueous component in the digesting process, which comprises continuously forcing cooked, comminuted oil-bearing material, including the aqueous component, into a closed container until the same is full and the material therein is under pressure above atmospheric at the top of the container, the elements of said material separating into respective strata according to their specific gravities during the building of said pressure, and utilizing a predetermined value of said pressure for forcing oil of the upper stratum out of the container.

6. A method as defined in claim 5 including the step of withdrawing material from the lowermost stratum of material in the container after the oil content of the container has been reduced to a predetermined amount, pressure of the material in the container being maintained.

7. In an installation of the type subject during use to motion about a position of equilibrium, the method of treating organic, oil-bearing material of the type requiring an aqueous component in the digesting process, which comprises continuously forcing cooked, comminuted oil-bearing material, including the aqueous component, into a closed container until the same is full and the material is under pressure above atmospheric at the top of the container, the constituent elements of said material separating into respective strata according to their specific gravities during the build-up of said pressure, utilizing a predetermined value of said pressure to force oil of the upper stratum out of the container, subsequently withdrawing precipitated solids from the lowermost stratum in the container faster than the comminuted material is forced into the container, and utilizing the resulting diminution of material in the container for terminating the withdrawal of said precipitated solids at a predetermined value of said diminution.

8. In an intallation of the type subject during use to motion about a position of equilibrium, the method of treating organic, oil-bearing material of the type requiring an aqueous component in the digesting process, which comprises continuously cooking and comminuting the material to form a mash, applying a continuous force upon said mash to urge the same into a closed container, maintaining said force after the container is full whereby a pressure above atmospheric is built up in the container, including the top portion thereof, and, concurrently with said pressure the constituent elements of the mash separate in accordance with their specific gravities, and, at a predetermined pressure, withdrawing the top fraction under the urging of said force.

9. In an installation of the type subject during use to motion about a position of equilibrium, the method of treating oil-bearing material of the type requiring an aqueous component in the digesting process which comprises continuously cooking and comminuting the material to form a mash, applying a continuous force upon said mash to urge the same into a closed container, maintaining said force after the container is full whereby a pressure above atmospheric is built up in the container, including the top portion thereof, and, concurrently with said pressure, the constituent elements of the mash separate in accordance with their specific gravities, withdrawing, at a predetermined value of said pressure, the top fraction under the urging of said force, and thereafter withdrawing the bottom fraction without interruption to the application of said force.

MELVIN J. NAPIER.

REFERENCES CITED

The following references are of record in the file of this patent:

UNITED STATES PATENTS

| Number | Name | Date |
| --- | --- | --- |
| 137,698 | Marshall | Apr. 8, 1873 |
| 668,210 | Powter | Feb. 19, 1901 |
| 1,219,115 | Laurento | Mar. 13, 1917 |
| 2,193,871 | Hanno | Mar. 19, 1940 |
| 2,375,590 | Schonberg | May 8, 1945 |
| 2,395,900 | Mueller | Mar. 5, 1946 |

FOREIGN PATENTS

| Number | Country | Date |
| --- | --- | --- |
| 25,425 | Great Britain | 1901 |

Certificate of Correction

April 26, 1949.

Patent No. 2,468,636.

MELVIN J. NAPIER

It is hereby certified that error appears in the printed specification of the above numbered patent requiring correction as follows:

Column 4, lines 49 and 50, strike out "duct 48 that is in communication with the interior of the several"; and that the said Letters Patent should be read with this correction therein that the same may conform to the record of the case in the Patent Office.

Signed and sealed this 8th day of November, A. D. 1949.

[SEAL]

THOMAS F. MURPHY,
*Assistant Commissioner of Patents.*